Feb. 28, 1950     E. T. LESSIG     2,498,859
TIRE
Filed June 18, 1947
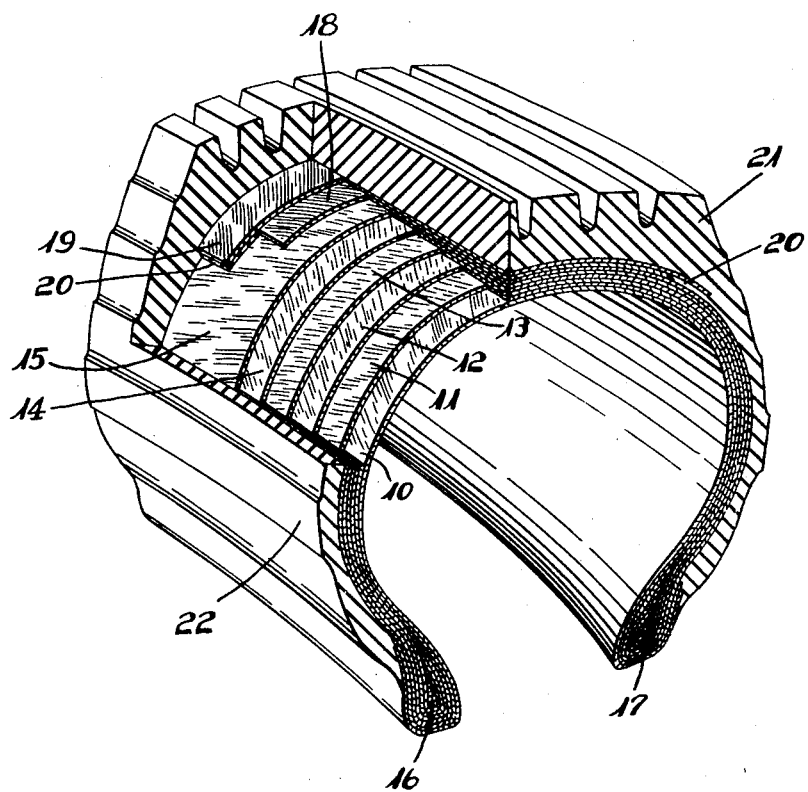
Inventor
Edward T. Lessig Patented Feb. 28, 1950

2,498,859

UNITED STATES PATENT OFFICE 2,498,859

TIRE

Edward T. Lessig, Cuyahoga Falls, Ohio, assignor to The B. F. Goodrich Company, New York, N. Y., a corporation of New York Application June 18, 1947, Serial No. 755,341

10 Claims. (Cl. 152—355)

This invention relates to tires and is directed especially to improvements in pneumatic tire construction for increasing the resistance of tires to the effects of bruising blows caused by the pounding action over rough roads and other impacts against the tires.

Objects of the invention are to provide a tire construction having improved bruise resistance especially under severe off-the-road service, to provide an improved tire construction in which breaker plies operate in coordination with underlying body reinforcing plies to provide superior resistance to bruising especially under conditions of pounding when running on rough surfaces, to provide an effective bond between the tread and tire body so that ply or tread separation will not occur, to provide a tire structure which may be ordinarily retreaded without requiring replacement of the breaker ply, to provide for low operating temperatures, to provide a strong tire having long life, and to provide for economy of material and convenience of manufacture.

These and further objects will be apparent from the following description, reference being had to the accompanying drawing in which:

Fig. 1 is a perspective view in section of a tire casing constructed in accordance with and embodying the invention, parts being broken away in steps and sectioned.

I have found that the bruise resistance of a tire, that is, the ability of the tire to avoid damaging effects from the action of bruising blows, is affected not only by the disposition of the plies therein but also by the relative elastic stretchability of the breaker and body plies. In accordance with the invention, superior bruise resistance is attained by combining breaker plies which are suitably stretchable and have a high elastic recovery with less stretchable body plies. The breaker plies act with the resilient rubber or other rubber-like material in which they are embedded and with the body plies to distribute the stresses caused by impact forces of varying severity and occurrence, and to avoid injurious concentrations of the stresses in the tire. It is found moreover that in tires constructed in accordance with the invention, the integrity of the plies is more effectively maintained because of the ability of the tires to resist cord breakage in both breaker and body reinforcing plies which further minimizes or entirely avoids the development of objectionable conditions such as ply separation and excessive tire growth.

Referring to the drawing, the invention is applied to a tire suitable for truck or passenger car use, it being understood that the number of plies and the bead construction may be varied in accordance with the requirements of the intended use. The tire comprises a plurality of reinforcing or body plies extending from bead to bead and designated by the numerals 10, 11, 12, 13, 14 and 15 and superimposed upon one another, the plies being preferably of cord insulated by a coating of rubber and the plies being arranged with the cords in crossed relation. The margins of the plies are folded about inextensible beads 16 and 17 so as to anchor the plies securely.

Outward of the body plies 10 to 15 one or more plies such as breaker plies 18 and 19 are employed. Each breaker ply is a narrow ply with margins terminating short of the bead portions and comprises a plurality of parallel cords preferably in weftless or weak-wefted arrangement. The breaker plies 18 and 19 are preferably arranged with the cords diagonally in crossed relationship as shown in the drawings, extending continuously from margin to margin of the breaker plies. The breaker plies 18 and 19 may be arranged in stepped relationship to avoid an abrupt termination of the reinforcement at the breaker ply margins, for example, as shown in the drawing, wherein one ply, in this case the outer ply 19, is wider than and overlies the margins of the other ply 18. For most effective tying in of the margins of the breaker plies an extra thickness or filler 20 of rubber-like material may be included at such margins. A body of rubber or other rubber-like body material comprising a tread 21 and sidewall 22 extends from bead portion to bead portion and the whole is united as an integral construction by vulcanization.

In accordance with the invention the body plies 10 to 15 are composed of cords having low stretch properties, and the breaker plies 18 and 19 are composed of cords which are relatively very stretchable and have a high elastic recovery. The construction is such that under a given load the individual cords of a breaker ply have a recoverable stretchability substantially greater than the individual cords of the bead-to-bead plies per unit of cord material, that is per unit of cord diameter or other factor indicative of the amount of cord material in weight per unit of volume thereof. For example, a suitable ply of textile material may be composed of rayon cords having a dry stretchability of two per cent at five pounds loading while a breaker ply of textile material which is suitable for use in combination with the rayon body plies is composed of nylon cords having around six and one-half per cent average dry stretchability at five pounds loading but may range from around five per cent to eight per cent for the same gauge cord.

Other combinations of cord material may be used for the purpose of the invention. For example, cotton, wire or other cord of suitably low stretchability may be used in the body plies while rayon cords of suitably high twist or other relatively stretchable cord material with good elastic recovery may be used in the breaker plies. It is preferred that in the direction of the cords, the material of the breaker plies has a stretchability of from two to six times the stretchability of the fabric of the body plies under a given working load to provide the advantages of the invention.

The superior bruise resistance obtainable by the construction of the invention is not easily shown by analysis of the stresses and strains in the tire because of the complex interaction of the tire components and the complexity of the forces imposed upon the tire in service. However, the bruise resistance of the tire may be demonstrated by subjecting the tire to a penetration bruise test in which the rounded end of a shaft is forced endwise against the tire tread and noting the depth of penetration or force required or both as a value indicative of the first failure of cords in the tire.

Penetration bruise tests were made on two sets of tires of identical construction except as to the breaker ply material. In both sets of tires the material of the body plies was of rayon. In one set of tires the breaker plies were of the same rayon material as that of the body plies and in the other set the breaker plies were of nylon cord with relatively high stretchability as compared with the rayon body plies. Under the slow penetration bruise test above described the tires having the breaker ply cords of relatively stretchable nylon showed a penetration and force value upon first cord failure over sixty per cent greater than the corresponding value at first cord failure for tires having breaker ply cords and body ply cords of the same rayon material.

This superiority of the tires constructed in accordance with the invention has been corroborated by field tests of tires under the same service conditions. Examination by dissection of tires after such field testing has shown in the case of tires with rayon breaker cords of the same stretchability as the rayon body cords that many of the tire cords were broken in short pieces, whereas in the case of tires with relatively stretchable nylon breaker cords and rayon body cords of less stretchability the tires appeared substantially undamaged and a negligible number of tire cords were broken even after being subjected to service conditions over a considerably greater mileage than in the case of the tires with rayon breaker cords of the same stretchability as the rayon body cords.

Heavy and rapidly moving vehicles especially in off-the-road service often impose severe pounding conditions upon tires by repeated impacts against hard objects which often has reduced the normal life of the tires undesirably. The tire construction hereinabove described has been found to provide markedly increased assurance of obtaining a long tire life under such severe conditions.

Variations may be made without departing from the scope of the invention as it is defined in the following claims.

I claim:

1. A pneumatic tire comprising a body of rubber-like material terminated in bead-portions, a plurality of cord plies disposed in super-imposed relation in said body, a group of said plies comprising cords extending continuously from bead portion to bead portion and another of said plies terminating short of said bead portions with the cords of the ply each extending directly in the shortest path from its position in one margin to its position in the other margin of the ply and the cords of the last mentioned ply having substantially greater stretchability per unit of cord material than the cords of the plies of said group, providing resistance to impacts by the coaction of all said plies and said rubber-like material.

2. A pneumatic tire comprising a body of rubber-like material terminating in bead portions, a plurality of cord plies disposed in super-imposed relation in said body, a group of said plies comprising cords extending continuously from bead portion to bead portion and another of said plies terminating short of said bead portions with the cords of the ply extending from margin to margin thereof and the last-mentioned ply comprising cords of nylon having substantially greater stretchability per unit of cord material than the cords of said group, providing resistance to impacts by the coaction of all said plies and said rubber-like material.

3. A pneumatic tire comprising a body of rubber-like material terminating in bead portions, a plurality of cord plies disposed in super-imposed relation in said body, a group of said plies comprising cords of rayon extending continuously from bead portion to bead portion and another of said plies terminating short of said bead portions with the cords of the ply extending from margin to margin thereof and the last mentioned ply comprising cords of nylon having substantially greater stretchability per unit of cord material than the cords of said group, providing resistance to impacts by the coaction of all said plies and said rubber-like material.

4. A pneumatic tire comprising a body of rubber-like material terminating in bead portions, a plurality of reinforcing plies having cords extending in said body continuously from bead portion to bead portion, a breaker ply disposed in said body outwardly of said reinforcing plies in closely spaced relation thereto and comprising cords each extending directly in the shortest path from its position in one margin to its position in the other margin of said breaker ply and terminating short of said bead portions, the cords of said breaker ply having substantially greater stretchability per unit of cord material than the cords of said reinforcing plies, providing resistance to impacts by the co-action of said breaker ply, said reinforcing plies and said rubber-like material.

5. A pneumatic tire comprising a body of rubber-like material terminating in bead portions, a plurality of reinforcing plies having cords extending in said body continuously from bead portion to bead portion, breaker plies disposed in said body outwardly of said reinforcing plies in closely spaced relation thereto and comprising cords extending from margin to margin of said breaker plies and terminating short of said bead portions, said breaker plies comprising cords having substantially greater stretchability per unit of cord material than the cords of said reinforcing plies, providing resistance to impact by the co-action of said breaker plies, said reinforcing plies and said rubber-like material.

6. A pneumatic tire comprising a body of rubber-like material terminating in bead portions, a plurality of reinforcing plies having cords extending in said body continuously from bead portion to bead portion, breaker plies disposed in said body outwardly of said reinforcing plies in closely spaced relation thereto and comprising cords extending from margin to margin of said breaker plies and terminating short of said bead portions, said breaker plies comprising cords having from two to six times the stretchability per unit of cord material than the cords of said reinforcing plies, providing resistance to impact by the coaction of said breaker plies, said reinforcing plies and said rubber-like material.

7. A pneumatic tire comprising a body of rubber-like material terminating in bead portions, a plurality of reinforcing plies having cords of textile reinforcing material extending in said body continuously from bead portion to bead portion, breaker plies disposed in said body outwardly of said reinforcing plies in closely spaced relation thereto and comprising cords of textile reinforcing material extending from margin to margin of said breaker plies and terminating short of said bead portions, said breaker plies comprising cords having substantially greater stretchability per unit of cord material than the cords of said reinforcing plies, providing resistance to impacts by the coaction of said breaker plies, said reinforcing plies and said rubber-like material.

8. A pneumatic tire comprising a body of rubber-like material terminating in bead portions, a plurality of reinforcing plies having cords of rayon extending in said body continuously from bead portion to bead portion, breaker plies disposed in said body outwardly of said reinforcing plies in closely spaced relation thereto and comprising cords of nylon extending from margin to margin of said breaker plies and terminating short of said bead portions, said cords of nylon having substantially greater stretchability per unit of cord material than said cords of rayon, providing resistance to impacts by the coaction of said breaker plies, said reinforcing plies and said rubber-like material.

9. A pneumatic tire comprising a body of rubber-like material terminating in bead-portions, a plurality of cord plies disposed in super-imposed relation in said body, a group of said plies comprising cords extending continuously from bead portion to bead portion and another of said plies terminating short of said bead portions with each cord of the ply extending diagonally from margin to margin of the ply and the cords of the last-mentioned ply having substantially greater stretchability per unit of cord material than the cords of the plies of said group, providing resistance to impacts by the coaction of all said plies and said rubber-like material.

10. A pneumatic tire comprising a body of rubber-like material terminating in bead portions, a plurality of reinforcing plies having cords extending in said body continuously from bead portion to bead portion, breaker plies disposed in said body outwardly of said reinforcing plies in closely spaced relation thereto and each comprising cords extending diagonally from margin to margin of the ply and in crossed relation to the cords of the adjacent breaker ply and terminating short of said bead portions, said breaker plies comprising cords having substantially greater stretchability per unit of cord material than the cords of said reinforcing plies, providing resistance to impact by the coaction of said breaker plies, said reinforcing plies and said rubber-like material.

EDWARD T. LESSIG.

REFERENCES CITED

The following references are of record in the file of this patent:

UNITED STATES PATENTS

| Number | Name | Date |
|---|---|---|
| 1,152,756 | Petersen | Sept. 7, 1915 |
| 1,875,445 | Hall | Sept. 6, 1932 |
| 2,317,911 | Hoff | Apr. 27, 1943 |